United States Patent
Kobayashi et al.

(10) Patent No.: US 9,690,184 B1
(45) Date of Patent: Jun. 27, 2017

(54) ROTATABLE SURVEILLANCE CAMERA AND METHOD

(71) Applicants: Herbert S Kobayashi, Webster, TX (US); Phillip C. Lipoma, Dickinson, TX (US)

(72) Inventors: Herbert S Kobayashi, Webster, TX (US); Phillip C. Lipoma, Dickinson, TX (US)

(*) Notice: Subject to any disclaimer, the term of this patent is extended or adjusted under 35 U.S.C. 154(b) by 0 days.

(21) Appl. No.: 15/340,456

(22) Filed: Nov. 1, 2016

(51) Int. Cl.
| | |
|---|---|
| *G03B 37/02* | (2006.01) |
| *G03B 17/56* | (2006.01) |
| *H04N 5/232* | (2006.01) |
| *H04N 7/18* | (2006.01) |
| *H02P 7/00* | (2016.01) |
| *H02K 7/116* | (2006.01) |
| *H02P 7/03* | (2016.01) |

(52) U.S. Cl.
CPC .......... *G03B 37/02* (2013.01); *G03B 17/561* (2013.01); *H02K 7/116* (2013.01); *H02P 7/03* (2016.02); *H04N 5/23238* (2013.01); *H04N 7/183* (2013.01)

(58) Field of Classification Search
None
See application file for complete search history.

(56) References Cited

U.S. PATENT DOCUMENTS

| | | | | |
|---|---|---|---|---|
| 4,877,185 | A * | 10/1989 | Kufrin | B05B 3/044 239/242 |
| 4,945,367 | A * | 7/1990 | Blackshear | G08B 13/19619 348/143 |
| 5,289,091 | A * | 2/1994 | Wada | H04N 7/183 318/282 |
| 8,845,212 | B1 * | 9/2014 | Mayer | G03B 17/561 396/428 |
| 2006/0039687 | A1 * | 2/2006 | Yang | F16M 11/10 396/20 |
| 2009/0073388 | A1 * | 3/2009 | Dumm | F16M 11/10 352/243 |
| 2016/0070154 | A1 * | 3/2016 | Lai | G03B 17/561 396/428 |

* cited by examiner

*Primary Examiner* — W B Perkey
(74) *Attorney, Agent, or Firm* — Kenneth L. Nash

(57) ABSTRACT

A rotatable video surveillance system is configured with a drive mechanism that rotates a bracket for a camera up to 360 degrees. The drive mechanism comprises a plurality of gears that rotate a camera back and forth up to at least 180 degrees. The drive mechanism comprises a control arm connecting between the first gear and a second gear, and a third output gear connected to a rotatable bracket. The drive mechanism typically rotates the bracket at a non-linear speed. A switch may be connected to produce back and forth rotation or pause. An electronic control can be used to control the speed of said drive mechanism and/or pan angle and pause. The rotatable surveillance camera covers at least up to 180 degrees. At night, a camera may see 10 to 30 feet, but with a spotlight the camera may see 300' to 600'. Doppler radar range is about 1 mile.

19 Claims, 5 Drawing Sheets

ROTATABLE SURVEILLANCE CAMERA AND METHOD

BACKGROUND OF THE INVENTION

Field of the Invention

The present invention relates generally to rotatable video surveillance systems and, more particularly, to a mechanism for the rotation of video cameras, lights, and the like mounted to a bracket mounted on the drive mechanism.

Background of the Invention

It is highly desirable for some cameras to rotate or pan to cover a wider range of area. Prior art video monitoring systems are typically pan and tilt units that utilize a processor to control the movement or pan of the cameras. These systems advantageously utilize adjustable pan angles that are computer controllable as to angle and sometimes as to speed for the pan. It is sometimes desirable to be able to add lights, radar, Doppler radar, motion detectors, PIR detectors, and the like to the camera mounting bracket.

While relatively inexpensive mass produced motor systems such as wiper motors have gears and power suitable for rotating cameras and other items for a camera bracket, the speed of rotation of about one cycle per second is much too high for use with cameras and the amount of rotation for panning may be too large or small. As well, loss of control over the pan range of motion occurs.

There exists a need for a rotatable camera system. Consequently, those skilled in the art will appreciate the present invention.

SUMMARY OF THE INVENTION

A primary object of the present invention is to provide a scanning surveillance system.

Another object of the present invention is to provide a scanning surveillance system which rotates up to 180 degrees; however a slip ring for all signals would enable 360 degree scanning. This scanning surveillance system increases the camera angle coverage approximately six times and at night may increase the visible range 30 times.

Still another object of the present invention is to provide a scanning surveillance system capable of mounting a plurality of components to be utilized for increased surveillance.

One general aspect includes a camera rotatable up to 180 degrees. The rotatable camera also includes a rotatable bracket on which the camera is mounted. The drive mechanism includes a first gear that rotates up to 360 degrees or pause for measurement and continue rotation, a second gear that rotates back and forth up to 180 degrees, and a control arm connecting between the first gear and the second gear, and a third output gear connected to the rotatable bracket. The third output gear has a diameter ratio with the second gear to produce a predetermined back and forth oscillation up to 180 degrees. The third output gear may be operably connected to the rotatable bracket. The motor system may be operably connected to the drive gear and has a suitable rotation output speed or pause for measurement then continue. The motor system may rotate continuously and/or at a constant speed in one direction or rotate bi-directionally or pause for taking motion detection. The motor system may also include a motor and a gear reduction.

Implementations may include one or more of the following features: the camera may further include a light, radar unit, and/or a directional apparatus mounted on the rotatable bracket. The camera further may include a double pole double throw switch to control bidirectional rotation of the motor system. Additionally, the camera system may include a potentiometer to control the rotation or switch to pause for motion measurement and continue rotation. The motor system may include a drive gear, a bearing, a flex joint, a gear reduction, and a motor. The angular rotation speed of the second gear may be non-linear.

The camera method provides for a motor system which may rotate at a constant speed in one direction or may rotate bi-directionally or pause to obtain a Doppler radar motion detection. The camera method provides for a motor system including a motor and a gear reduction. The camera method further may include a directional apparatus on a rotatable mounting bracket. The camera method may also include a double pole double throw switch to control bi-directional rotation of the motor system or an on and off switch. Additionally, the camera method provides that the motor system may include a potentiometer to control the rotation. Furthermore, the camera method provides for a motor system comprising a drive gear, a bearing, a flex joint, a gear reduction, and a motor. The camera method also provides that the angular rotation speed of the second gear may be non-linear.

One general aspect includes a method to provide a camera rotatable up to 180 degrees which may be configured with or without a slip ring, including the steps of: providing a camera, a rotatable bracket on which the camera is mounted, and a drive mechanism. The method includes providing a drive gear driven by the motor which in turn is connected to a first gear. Furthermore, the method also includes providing drive mechanism comprising a first gear that rotates up to 360 degrees, a second gear that rotates back and forth less than 180 degrees, and a control arm connecting between the first gear and the second gear, and a third output gear connected to the rotatable bracket. The method also includes providing a third output gear which may have a diameter ratio with the second gear to produce a predetermined back and forth oscillation less than 180 degrees. The third output gear being may be operably connected to a rotatable bracket. Additionally, the method also includes providing a suitable motor system operable to replace an unsuitable motor system, the motor system being operably connected to a drive gear. The method provides that the motor system has a suitable rotation output speed. The method also provides that the motor system may rotate continuously in one direction or rotate bi-directionally or pause to measure motion detection.

Implementations may include one or more of the following features: the method provides the motor system comprises a motor and a gear reduction. The method may further include a directional apparatus on a rotatable mounting bracket. Furthermore, the method may include a double pole double throw switch with on and off for pausing to take a motion detection measurement or to control bi-directional rotation of the motor system. The method provides the motor system may include a potentiometer to control the rotation. Additionally, the method provides the motor system comprises a drive gear, a bearing, a flex joint, a gear reduction, and a motor. The method provides the angular rotation speed of the second gear may be non-linear.

These and other objects, features, and advantages of the present invention will become clear from the figures and description given hereinafter. It is understood that the objects listed above are not all inclusive and are only intended to aid in understanding the present invention, not to limit the bounds of the present invention in any way.

BRIEF DESCRIPTION OF THE DRAWINGS

The above general description and the following detailed description are merely illustrative of the generic invention, and additional modes, advantages, and particulars of this invention will be readily suggested to those skilled in the art without departing from the spirit and scope of the invention. A more complete understanding of the invention and many of the attendant advantages thereto will be readily appreciated by reference to the following detailed description when considered in conjunction with the accompanying drawings, wherein like reference numerals refer to like parts and wherein.

DETAILED DESCRIPTION OF THE PREFERRED EMBODIMENT

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
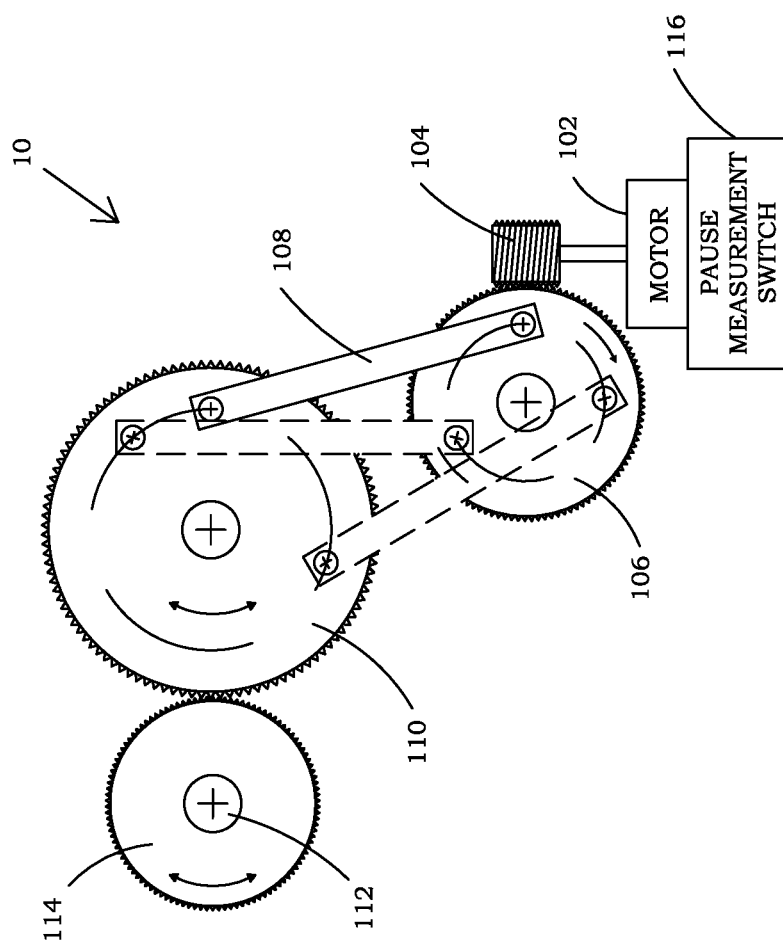
FIG. 1 is a schematic showing a gear train for a scanning surveillance system in accord with one possible embodiment of the present invention.

Referring now to the drawings and more specifically to FIG. 1, there is shown a first general embodiment of a scanning surveillance system in accord with the present invention, namely surveillance system 10 and components thereof are shown. A drive motor system 102 of desired speed, e.g. to pan the camera by 10 to 20 seconds per cycle, is coupled to a first gear 106 via a drive gear 104. Drive gear 104 may be a worm gear, but may also be a spur gear or any other gear to engage first gear 106 and produce angular rotation to first gear 106. First gear 106 is coupled to a second gear 110 by a control arm 108. Control arm 108 is shown in other positions in dash but in this particular embodiment changes rotational movement of first gear 106 into back and forth movement of second gear 110. Second gear 110 is coupled to a third gear 114 and third gear 114 has an output shaft 112. Third gear 114 provides output shaft 112 with back and forth output. Output shaft 112 may be connected to the camera bracket that supports the camera and any other desired items such as lights, radar, and the like. Gear 114 is sized compared to gear 110 to provide the desired speed and/or pan angle of the pan of the camera.

In one embodiment, aspects of drive gear 104, first gear 106, control arm 108, second gear 110 and third gear 114 are part of a mass produced wiper mechanism, which is available at reduced costs. However, the mass produced system utilizes a motor drive assembly that rotates much too quickly making it undesirable for use as a camera rotation system. The mass produced system also does not have a desired and/or selectable pan angle, e.g. 180 degrees as might be desirable for the pan angle on the side of a building. In one embodiment, the original motor is removed and a new connection is made to the shaft of drive gear 104. A new motor drive 102 that may also include gear reduction is then connected to drive gear 104, which allows a powerful but low cost mechanism to pan the bracket upon which the camera and lights, radar and so forth. Other steps may be taken to adjust and/or fix the angular range of the panning motion in this embodiment. This may include changes to the drive train and/or electronic pan range controls and splitting for all signals.

As indicated in FIG. 1, control arm 108 pivots at a respective pivot point on first gear 106 and second gear 110 to control the degree of angular rotation of second gear 110. First gear 106 may rotate 360 degrees in one or both directions. The angular rotation speed of second gear 110 when connected as shown is non-linear and slows down especially near the rotational end points of second gear 110. This occurs even though the motor operates at a constant speed. Second gear 110 rotates in back and forth oscillation up to 180 degrees or more dependent on gear ratio. Second gear 110 is further coupled to third gear 114 whose output shaft 112 provides the mechanism output. The ratio of second gear 110 and third gear 114 controls the output shaft 112 angular rotation. Output shaft 112 may also be referred to as output gear. One possible embodiment may include, for example, first gear 106 and second gear 110 to be configured with control arm pivot points set to provide second gear 110 peak to peak angular rotation of 90 degrees with a desired output shaft peak to peak angular rotation of 180 degrees, then a 2:1 ratio between second gear 110 and third gear 114 will be required.

The terminal limits of the back and forth oscillating axis are then a predetermined rotation of second gear 110. The predetermined amount of rotation may be set to any back and forth rotational pan by changing the length of control arm 108 and/or changing the gear ratios. For example, the pan may be adjusted greater than 180 degrees making third gear 114 smaller after control shaft 108 is made larger. A pause measurement switch 116 may be configured to control the rotation of the motor 102 so that a directional apparatus may take a measurement. The pause can be triggered by an event captured by said directional apparatus, wherein a measurement may be recorded or observed by a user. Further, the pause may also be predetermined by a user to stop the motion of the motor at a plurality of times and durations as desired.

Figure 2:
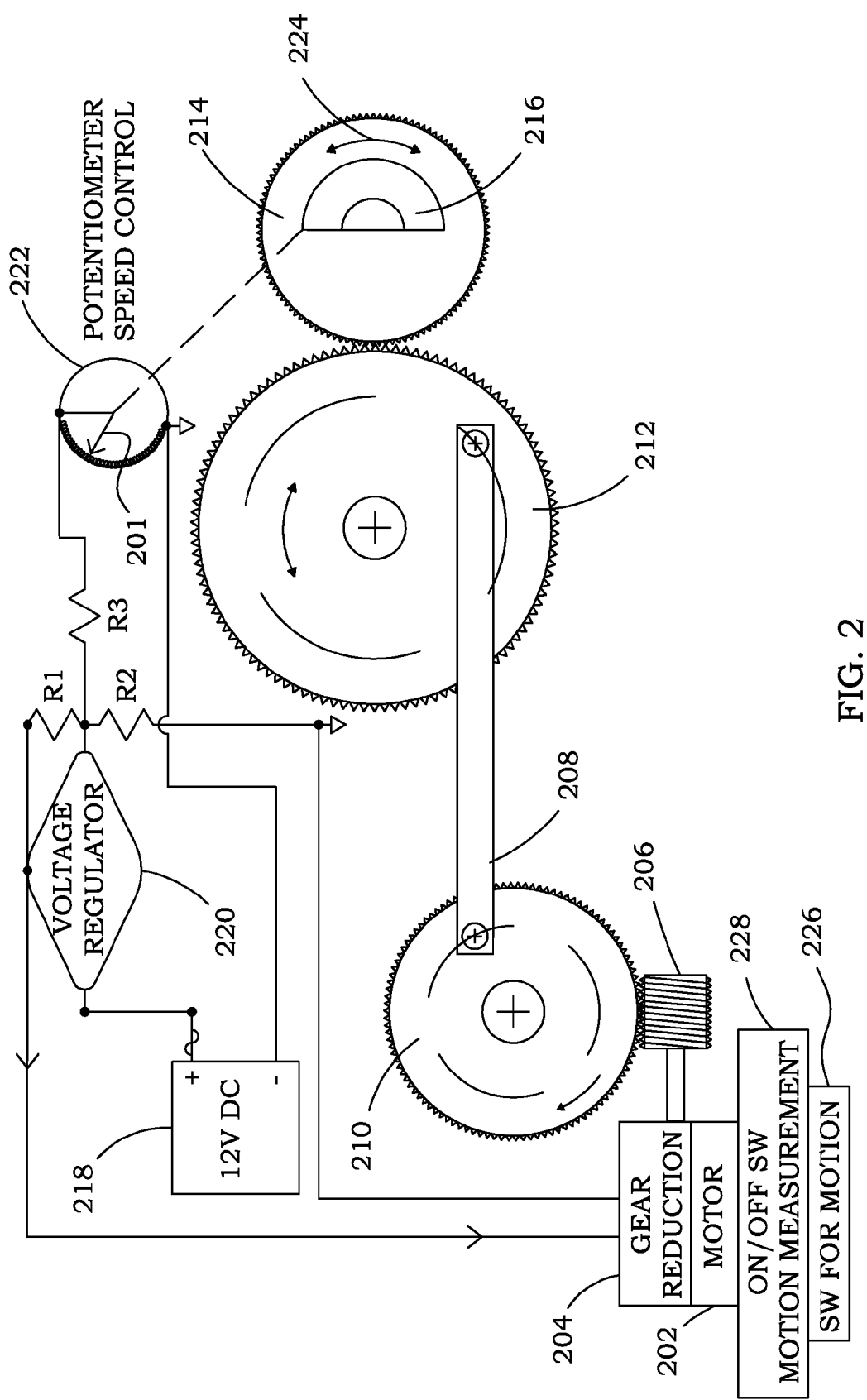
FIG. 2 is a schematic showing a gear train and electronic control for a scanning surveillance system in accord with one possible embodiment of the present invention.

Referring to FIG. 2, an embodiment is shown that allows motor speed to be adjusted utilizing wiper arm 201 that may be adjusted for a desired speed. The scanner motor 202 may rotate in one direction which drives the reduction gear box 204 to slow the wiper output from 1 second per cycle to approximately 20 seconds per cycle. The unmodified cycle time of the wipe is around 1 second per cycle which is an unsuitable rotation output speed. The modified wiper time is around 10 to 20 second per cycle which is a suitable rotation output range of speeds. The drive motor RPM is estimated to be reduced from approximately 3600 RPM to the desired speed of approximately 200 RPM by gear reduction. Reduction gear box 204 turns drive gear 206 which is coupled to first gear 210. First gear 210 is connected to second gear 212 by connecting or control rod 208. As first gear 210 is rotated, guiding rod 208 oscillates causing second gear 212 to rotate. Second gear 212 is coupled to third gear 214 which may also be referred to as a stud gear. Third gear 214 rotates as second gear 212 rotationally engages third gear 214. A detector mount 216 is coupled to third gear 214 and rotationally oscillates along an axis 224 which typically rotates the camera bracket back and forth at least 180 degrees although could be greater than 180 degrees if third gear 214 is sufficiently smaller than second gear 212. The scanning axis 224 is determined by the diameter ratio of third gear 214 and second gear 212.

The degree of output motion of axis 224 may be altered to a desired range by repositioning connecting rod 208 on second gear 212 and/or changing gear ratios of the second gear to the third gear and/or by adding switches. Voltage regulator 220 is connected to a 12 V DC power source 218. The voltage regulator 220 adjust terminal is decreased as the potentiometer is rotated towards ground. The voltage quiescent of voltage regulator 220 is set by resistors R1, R2, and R3. Potentiometer 222 can be used to control the speed of rotation by controlling the speed of motor 202. As the voltage applied to motor 202 is increased or decreased, the corresponding motor speed is increased or decreased. An on/off switch for motion measurement 228 may be configured to control the rotation of the motor 202 so that a directional apparatus may take a measurement. The pause can be triggered by an event captured by said directional apparatus, wherein a measurement may be recorded or observed by a user. Further, the pause may also be predetermined by a user to stop the motion of the motor at a plurality of times and durations as desired. A switch for motion 226 may also be operated to manually stop the scanning motion. This may be desirable if, for example, motion is detected by a motion detector or visually with a camera. The switch for motion 226 also can be set to stop at plurality of points or time automatically.

Figure 3:
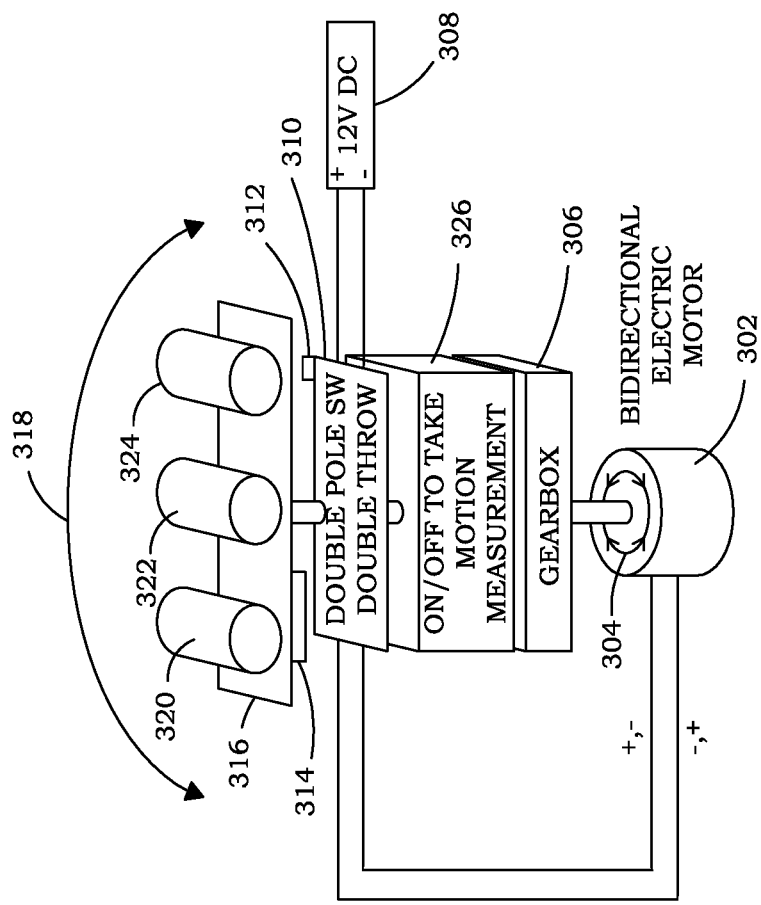
FIG. 3 is a schematic diagram showing use of a bidirectional electric motor control with double pole double throw switch for a scanning surveillance system in accord with one possible embodiment of the present invention.

Referring to FIG. 3, an alternate embodiment of the invention is shown with an electronically controlled bi-directional motor 302 utilizing a double pole double throw switch 310. Bi-directional motor assembly 302 drives a reduction gearbox 306 which rotates the detector mount 316, which may also be referred to as mounting bracket or rotatable bracket 316. A camera 320, a spotlight 322, or a desired component 324 may be mounted to detector mount 316. A plurality of other desired components 324 may be used such as a video camera, spotlight, rain gauge, radiation detector, paint gun, Doppler radar, radar unit, or other like desired directional sensor or component. While the term directional apparatus is used in the claims, it will be understood that other types of sensors or detectors could also be used such as smoke, fire, CO detectors, temperature, wind speed, rain, gas, pollution, radiation, and the like so that motion detectors refers to other types of detectors which could produce information viewed by a particular camera. As well, many types of motion sensor detectors could be used such as radar, thermal, magnetic, ultrasonic or the like. Detectors may or may not be automatically reset after time or may require manual resetting.

Accordingly the present invention is not limited to uni-directional drive motor assemblies. Bi-directional electric motor 302 has an angular rotation 304, which could range from about ten to three hundred fifty degrees. As bi-directional motor 302 rotates, reduction gearbox 306 rotates mounting bracket 316. Mounting bracket 316 is configured with a stop 314 and a contact 312. Mounting bracket 316 may rotate up to at least 180 degrees along a rotational axis 318, when used at the side of a building where a maximum range would be 180 degrees. When stop 314 engages contact 312, double pole double throw switch reverses the polarity of current received from the 12 V DC source 308 which in turn causes bi-directional motor 302 to reverse directions. The reverse motion continues until stop 314 engages contact 312 and the motor again reverses the rotation.

The range of the pan of the bidirectional motor assembly 302 may be adjusted depending on the electronic connections of the switch so that the switch may be connected to provide any range of pan desired. Stop 314 and/or contact 312 may be positioned and/or an additional contact may be utilized to control the angle of pan. An on/off switch to take motion measurement 326 may be configured to control the rotation of the motor 302 so that a directional apparatus 324 or the like may take a measurement. The pause can be triggered by an event captured by said directional apparatus 324 or the like, wherein a measurement may be recorded or also observed by a user. Further, the pause may also be predetermined by a user to stop the motion of the motor at a plurality of times and durations as desired. Switch 326 may also be operated to manually stop the scanning motion. This may be desirable if, for example, motion is detected by a motion detector or visually with a camera. The switch for motion 326 may also be set to stop at plurality of points or time automatically. For instance, a plurality of stops 314 and contacts 312 may be positioned at determined angles or ranges of motions to capture measurements in specific areas of interest which may trigger switch 326 to start or stop the motion.

Figure 4:
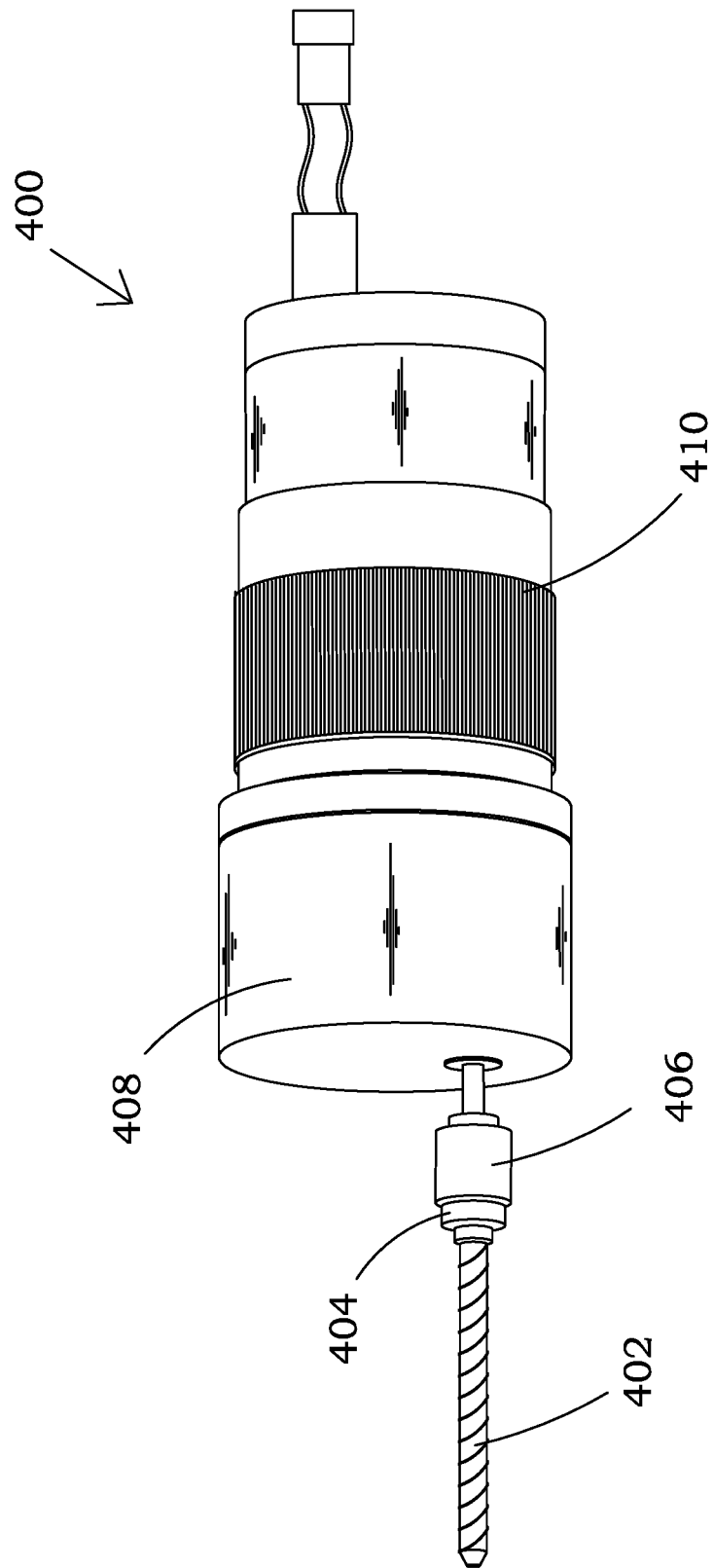
FIG. 4 is a perspective view of a scanning surveillance system in accord with one possible embodiment of the present invention.

Referring to FIG. 4, system 400 is shown. System 400 comprises drive gear 402, bearing 404, flex joint 406, reduction gear box 408, and a motor 410. Drive gear 402 may be a worm gear, spur gear, or another type of gear to rotate a first gear. A drive mechanism, for example a windshield wiper motor, may be unsuitable without modification because the rotation output speed for rotating a rotatable bracket is too fast. The output speed would be too great and produce an undesirable rotational speed to be suitable for surveillance. Therefore a motor 410 is used to decrease the rotational output speed of a mounting bracket.

The motor system 410 may be operably connected to a drive gear 402. The motor system 410 has a suitable rotational output speed of approximately around 10 to 20 seconds per cycle. A reduction in the rotational speed of the mounting bracket is desirable to properly utilize a camera upon a rotatable bracket. The unmodified speed does not allow a user to properly surveil an area due to the short cycle time. To properly surveil an area, an increase in the cycle period is required. To achieve this, a gear reduction assembly in gear box 408 decreases motor 410 RPM from an estimated 3600 RPM to a desired output of approximately 200 RPM by gear reduction. The decrease in output speed from motor 410 and reduction gear box 408 is then translated to a rotational output via flex joint 406 which is coupled to bearing 404. Bearing 404 is coupled to drive gear 402. Drive gear 402 rotates at a desired speed ultimately controlling the oscillation speed of any directional surveillance components.

Figure 5:
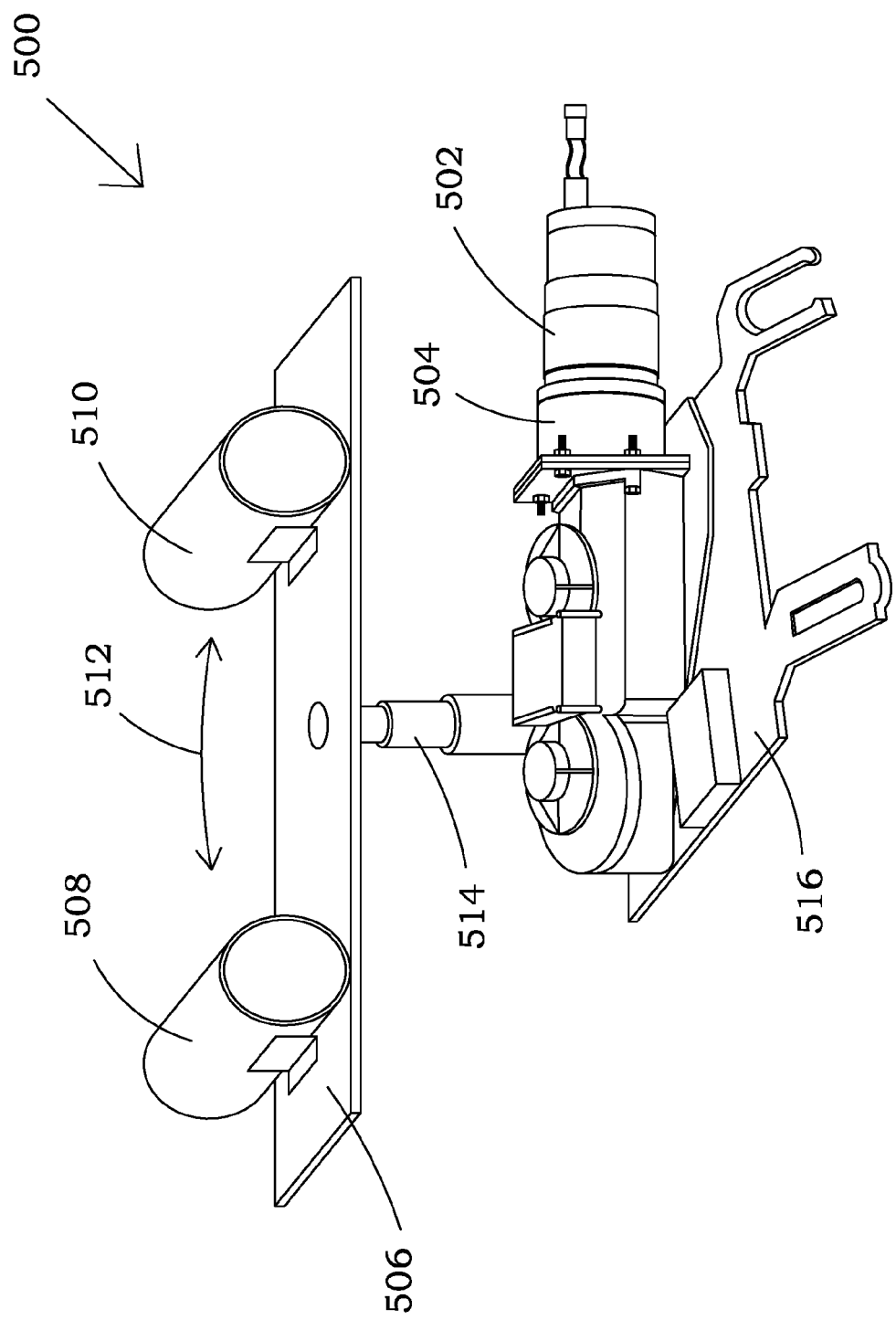
FIG. 5 is a perspective view of the motor system with bracket mount installed and surveillance components attached in accord with another possible embodiment of the present invention.

Referring to FIG. 5, an example of one embodiment of a rotatable surveillance system 500 is shown. Motor 502 is coupled to reduction gear box 504, and the assembly is mounted to gear assembly housing 516. Gear assembly housing 516 encloses a flex joint, a bearing, and a drive gear as can be seen in FIG. 4. Additionally, gear assembly housing 516 encloses a first gear coupled to a second gear by a connecting rod, the connecting rod coupled to a second gear, the second gear coupled to a third gear, as is shown in FIGS. 1 and 2. The third gear further comprises an output shaft 514 which is configured to rotate at least 180 degrees. Mounted to the opposite terminal end of output shaft 514, rotatable mounting bracket 506 is coupled to output shaft 514. As output shaft 514 rotates, rotatable mounting bracket 506 also rotates along an axis 512 at least 180 degrees.

Rotatable mounting bracket 506 may be configured to accept a plurality of desired components such as a video camera, spotlight, rain gauge, radiation detector, paint gun, Doppler radar, other any other directional desired directional sensor or component. While the term directional apparatus is used in the claims, it will be understood that other types of sensors or detectors could also be used such as smoke, fire, CO detectors, temperature, wind speed, rain, gas, pollution, radiation, and the like so that motion detectors refers to other types of detectors which could produce information viewed by a particular camera. As well, many types of motion sensor detectors could be used such as radar, thermal, magnetic, ultrasonic or the like. Detectors may or may not be automatically reset after time or may require manual resetting. One possible embodiment may include a camera 508 and a spotlight 510 mounted to a top mounting portion of rotatable bracket 506. With the use of a spotlight and a camera, there is an increase in surveillance range. A stationary camera covers about thirty degrees angular and stationary Doppler radar covers eight angular degrees. However, the rotatable surveillance camera and method covers up to 180 degrees. Furthermore, at night a camera may see 10 to 30 feet, however with a spotlight the camera may see 300' to 600' feet out with and, additionally, the Doppler radar range is about 1 mile. The rotational scanning axis 512 of rotatable bracket 506 is at least 180 degrees but may be less than 360 degrees. If the rotation is configured to be less than 360 degrees, the electrical connections to the directional components mounted to rotatable bracket 506 may be hard wired resulting in decreased cost as well as greater reliability.

The scanner comprises video camera or cameras to obtain a visual picture of the area under surveillance of the area also because the discrete detectors may need to be checked. Discrete detectors such as motion detectors and Doppler radars and laser beam detectors may pick up a person as well as birds and insects so may require a visual check. Code detectors may identify for example friend or foe (IFOF), and may require a visual check. Infrared temperature detector for fire detection may require a visual check not only to determine the location of the fire but also the intensity. More than one Doppler radar may detect the direction of a path of a bullet or IFOF The foregoing description of the preferred embodiments of the invention has been presented for purposes of illustration and description only. It is not intended to be exhaustive or to limit the invention to the precise form disclosed; and obviously many modifications and variations are possible in light of the above teaching. While redundant, different methods discussed above could be utilized together if desired. Such modifications and variations that may be apparent to a person skilled in the art are intended to be included within the scope of this invention as defined by the accompanying claims.

The invention claimed is:

1. A camera rotatable up to 180 degrees or more, comprising:
    a camera;
    a rotatable bracket on which the camera is mounted;
    a drive mechanism connected to said camera comprising a first gear that rotates up to 360 degrees with pause to take motion detection, a second gear that rotates back and forth less than 180 degrees, and a control arm connecting between said first gear and said second gear, a third gear connected to said rotatable bracket; said third gear comprising a diameter ratio with said second gear to produce a predetermined rotation back and forth pan angle up to 180 degrees or more, said third gear being operably connected to said rotatable bracket, a drive gear connected to said first gear; and
    a motor operably connected to said drive gear.

2. The camera of claim 1, wherein said motor is operably connected to rotate said first gear continuously in one direction or pause to take motion measurement, wherein said camera does not incorporate a slip ring to collect signals.

3. The camera of claim 1, wherein said motor is electronically controlled to operate bidirectionally or pause to take motion measurement.

4. The camera of claim 1, wherein said motor operates at a constant speed and said drive mechanism produces a non-linear speed for said rotatable bracket.

5. The camera of claim 1 further comprising a light mounted on said rotatable bracket.

6. The camera of claim 5 further comprising a Doppler radar or PIR detection unit mounted on said rotatable bracket.

7. The camera of claim 1 further comprising a double pole double throw switch to control bidirectional rotation and on or off take motion detection measurement of said motor.

8. The camera of claim 1 wherein said drive mechanism comprises a potentiometer.

9. The camera of claim 1, further comprising a motor system comprising said drive gear, a bearing, a flex joint, a gear reduction, and said motor.

10. The camera of claim 1 wherein angular rotation speed of said third gear is non-linear.

11. A method to provide a camera rotatable up to 180 degrees or more, comprising the steps of:
    providing a camera;
    providing a rotatable bracket on which the camera is mounted;
    providing a drive mechanism comprising a first gear that rotates up to 360 degrees or pause to take measurements, a second gear that rotates back and forth up to 180 degrees, and a control arm connecting between said first gear and said second gear, and a third output gear connected to said rotatable bracket;
    providing that said third output gear comprises a diameter ratio with said second gear to produce a predetermined rotation back and forth oscillation up to 180 degrees, said third output gear being operably connected to said rotatable bracket;
    providing a drive gear connected to said first gear; and
    providing a motor operably connected to said drive gear.

12. The method of claim 11, providing said motor rotates continuously in one direction, wherein said motor is operable to rotate up to 360 degrees without incorporating slip rings.

13. The method of claim 11, providing said motor rotates bi-directionally.

14. The method of claim 11, providing a motor system comprising said motor and a gear reduction assembly.

15. The method of claim 11, providing angular rotation speed of said second gear is non-linear.

16. The method of claim 11 comprising utilizing a mass produced drive mechanism and modifying said mass produced drive mechanism to control speed and pan angle of rotation of said rotatable bracket.

17. A rotatable camera system comprising:
    a camera;
    a motor;
    a reduction gear box operably connected to said motor;
    a drive gear connected to said reduction gear box;

a first gear operably engaged to said drive gear;

a second gear connected to said first gear by a connecting rod between said first gear and said second gear, said connecting rod driving said second gear rotationally, said second gear rotating up to at least 180 degrees;

a third gear operably connected to said second gear wherein said third gear angularly rotates at least 180 degrees, a peak to peak angular rotation of said third gear is determined by a diameter ratio of said second gear and said third gear;

an output shaft connected to said third gear;

a mounting bracket connected to said output shaft on an opposite terminal end from said third gear, wherein said mounting bracket rotates at least 180 degrees or more; and and said camera mounted on said mounting bracket.

18. The rotatable camera system of claim 17 further comprising said motor is connected to rotate continuously in one direction or pause to take a measurement.

19. The rotatable camera system of claim 17 further comprising a switch configured to control said motor to operate bidirectionally or pause.

\* \* \* \* \*